US011427695B2

(12) United States Patent
Gane et al.

(10) Patent No.: US 11,427,695 B2
(45) Date of Patent: Aug. 30, 2022

(54) USE OF SURFACE-REACTED CALCIUM CARBONATE AS ANTI-BLOCKING AGENT

(71) Applicant: Omya International AG, Oftringen (CH)

(72) Inventors: Patrick A. C. Gane, Rothrist (CH); Steffen Ohr, Sursee (CH); Catherine Jean Ridgway, Mühlethal (CH); Philipp Hunziker, Loveland, OH (US)

(73) Assignee: Omya International AG, Oftringen (CH)

( * ) Notice: Subject to any disclaimer, the term of this patent is extended or adjusted under 35 U.S.C. 154(b) by 219 days.

(21) Appl. No.: 16/861,566

(22) Filed: Apr. 29, 2020

(65) Prior Publication Data
US 2020/0255675 A1   Aug. 13, 2020

Related U.S. Application Data

(62) Division of application No. 15/576,154, filed as application No. PCT/EP2016/061991 on May 27, 2016, now Pat. No. 10,676,624.

(60) Provisional application No. 62/180,637, filed on Jun. 17, 2015.

(30) Foreign Application Priority Data

Jun. 10, 2015 (EP) .................................... 15171409

(51) Int. Cl.
*C08K 9/02* (2006.01)
*C08K 3/26* (2006.01)
*C09C 1/02* (2006.01)
*C09D 4/00* (2006.01)
*C08F 220/18* (2006.01)
*C09D 7/40* (2018.01)
*C09D 7/62* (2018.01)
*C01F 11/18* (2006.01)
*C09D 133/12* (2006.01)
*C09D 133/08* (2006.01)

(52) U.S. Cl.
CPC .............. *C08K 3/26* (2013.01); *C01F 11/185* (2013.01); *C08F 220/1802* (2020.02); *C09C 1/021* (2013.01); *C09C 1/022* (2013.01); *C09D 4/00* (2013.01); *C09D 7/62* (2018.01); *C09D 7/69* (2018.01); *C09D 133/12* (2013.01); *C01P 2004/03* (2013.01); *C01P 2004/51* (2013.01); *C01P 2004/61* (2013.01); *C01P 2006/12* (2013.01); *C01P 2006/14* (2013.01); *C08K 9/02* (2013.01); *C08K 2003/265* (2013.01); *C08K 2201/003* (2013.01); *C08K 2201/005* (2013.01); *C08K 2201/006* (2013.01); *C09D 133/08* (2013.01)

(58) Field of Classification Search
CPC ...... C08K 3/26; C08K 9/02; C08K 2003/265; C08K 2201/005; C08K 2201/006; C01F 11/185; C08F 220/18; C09C 1/021; C09C 1/022; C09D 4/00; C09D 7/62; C09D 7/69; C09D 133/12; C09D 133/08; C01P 2004/03; C01P 2004/51; C01P 2004/61; C01P 2006/12; C01P 2006/14
USPC .............................................. 523/200
See application file for complete search history.

(56) References Cited

U.S. PATENT DOCUMENTS

| 4,011,111 | A | 3/1977 | Ranger et al. |
| 5,266,397 | A | 11/1993 | Ogawa et al. |
| 5,358,998 | A | 10/1994 | Wendel et al. |
| 5,536,779 | A | 7/1996 | Wendel et al. |
| 6,018,010 | A | 1/2000 | Yamazaki et al. |
| 6,080,813 | A | 6/2000 | Wendel et al. |
| 6,284,034 | B1 | 9/2001 | Hioms et al. |
| 7,638,017 | B2 * | 12/2009 | Gane ............ C09C 1/021 162/158 |

(Continued)

FOREIGN PATENT DOCUMENTS

| EP | 0536597 A1 | 4/1993 |
| EP | 1975310 A1 | 10/2008 |

(Continued)

OTHER PUBLICATIONS

International Search Report from PCT/EP2016/061991, dated Jul. 26, 2016.
Written Opinion from PCT/EP2016/061991, dated Jul. 26, 2016.
European Search Report dated Aug. 3, 2015 for European Application No. 15171409.4.
International Preliminary Report on Patentability dated Dec. 21, 2017 for International Application No. PCT/EP2016/061991.
Office Action dated Dec. 19, 2018 for Korean Application No. 10-2018-7000893.
Office Action dated Feb. 5, 2019 for Japanese Application No. 2017-563935.

(Continued)

*Primary Examiner* — Hannah J Pak

(74) *Attorney, Agent, or Firm* — ALGM LLP; Harry J. Guttman

(57) ABSTRACT

The present invention relates to the use of a surface-reacted calcium carbonate as an anti-blocking agent in polymer(s) containing compositions, wherein the surface-reacted calcium carbonate is a reaction product of natural ground or precipitated calcium carbonate with carbon dioxide and one or more $H_3O^+$ ion donors in an aqueous medium, wherein the carbon dioxide is formed in situ by the $H_3O^+$ ion donors treatment and/or is supplied from an external source, an anti-blocking agent comprising surface-reacted calcium carbonate or a combination of surface reacted calcium carbonate and mineral material, a method for controlling the blocking of polymer(s) containing compositions, a polymer(s) containing composition comprising surface reacted calcium carbonate or a combination of surface reacted calcium carbonate and mineral material, a coating composition comprising such polymer(s) containing composition, as well as a substrate coated with such coating composition.

21 Claims, 4 Drawing Sheets

(56) References Cited

U.S. PATENT DOCUMENTS

| | | | |
|---|---|---|---|
| 9,012,554 | B2 | 4/2015 | Saunders et al. |
| 9,579,291 | B2 | 2/2017 | Schwarzentruber et al. |
| 9,950,502 | B2 | 4/2018 | Seyffer et al. |
| 2004/0020410 | A1 | 2/2004 | Gane et al. |
| 2004/0099390 | A1* | 5/2004 | Trochlil .............. D21H 19/36 |
| | | | 162/158 |
| 2006/0052503 | A1 | 3/2006 | Shimizu et al. |
| 2006/0122318 | A1 | 6/2006 | Jho et al. |
| 2011/0281130 | A1 | 11/2011 | Evstatieva et al. |
| 2013/0143995 | A1 | 6/2013 | Saunders et al. |
| 2013/0209708 | A1* | 8/2013 | Gane .................. B05D 1/36 |
| | | | 427/209 |
| 2014/0302337 | A1 | 10/2014 | Gane et al. |
| 2017/0224862 | A1 | 8/2017 | Ohr et al. |
| 2018/0036764 | A1 | 2/2018 | Knerr et al. |
| 2018/0327604 | A1 | 11/2018 | Diaz Quijano et al. |
| 2018/0353930 | A1 | 12/2018 | Rentsch et al. |
| 2018/0355182 | A1 | 12/2018 | Ippolito et al. |
| 2018/0355183 | A1 | 12/2018 | Rentsch et al. |
| 2019/0161619 | A1 | 5/2019 | Gerard et al. |
| 2020/0288719 | A1* | 9/2020 | Gantenbein ............ A01N 43/90 |
| 2020/0291235 | A1* | 9/2020 | Rentsch .................. C09C 1/022 |
| 2021/0115261 | A1* | 4/2021 | Sharma .................. C09C 1/021 |
| 2022/0017753 | A1* | 1/2022 | Gerard .................. D21H 21/52 |

FOREIGN PATENT DOCUMENTS

| | | |
|---|---|---|
| EP | 2264108 A1 | 12/2010 |
| EP | 2264109 A1 | 12/2010 |
| EP | 2684916 A1 | 1/2014 |
| JP | H05117443 A | 5/1993 |
| JP | 2001098164 A | 4/2001 |
| WO | 97/03119 A1 | 1/1997 |
| WO | 0039222 A1 | 7/2000 |
| WO | 2004083316 A1 | 9/2004 |
| WO | 2005121257 A2 | 12/2005 |
| WO | 2006053849 A1 | 5/2006 |
| WO | 2009074492 A1 | 6/2009 |
| WO | 2010094641 A1 | 8/2010 |
| WO | 2013083504 A1 | 6/2013 |

OTHER PUBLICATIONS

Office Action dated Jan. 3, 2019 for Canadian Application No. 2,986,967.
Office Action dated May 22, 2017 for Taiwanese Application No. 105117942.
English Translation of JP 05-117 443 (Year: 1993).
Machine Translation of JP 05-117 443 (Year: 1993).
U.S. Appl. No. 15/576,154 Restriction Requirement dated Apr. 15, 2019, 8 pages.
U.S. Appl. No. 15/576,154 Response to Restriction Requirement dated Jun. 6, 2019, 8 pages.
U.S. Appl. No. 15/576,154 nonfinal Office action dated Aug. 22, 2019, 27 pages.
U.S. Appl. No. 15/576,154 Response to nonfinal Office action dated Nov. 21, 2019, 16 pages.
U.S. Appl. No. 15/576,154 Notices of Allowance & Allowability dated Mar. 4, 2020, 16 pages.

* cited by examiner

USE OF SURFACE-REACTED CALCIUM CARBONATE AS ANTI-BLOCKING AGENT

CROSS-REFERENCE TO RELATED APPLICATIONS

This application is a divisional application of U.S. application Ser. No. 15/576,154 filed Nov. 21, 2017, entitled "USE OF SURFACE-REACTED CALCIUM CARBONATE AS ANTI-BLOCKING AGENT" which is a National Stage Entry of International Application No. PCT/EP2016/061991 filed May 27, 2016, entitled "USE OF SURFACE-REACTED CALCIUM CARBONATE AS ANTI-BLOCKING AGENT", and which claims the benefit of U.S. Provisional Application No. 62/180,637, filed Jun. 17, 2015 entitled "USE OF SURFACE-REACTED CALCIUM CARBONATE AS ANTI-BLOCKING AGENT" and also claims priority to EP Application No 15171409.4 filed Jun. 10, 2015 entitled "USE OF SURFACE-REACTED CALCIUM CARBONATE AS ANTI-BLOCKING AGENT."

The present invention relates to the use of a surface-reacted calcium carbonate as an anti-blocking agent in polymer(s) containing compositions, an anti-blocking agent comprising surface-reacted calcium carbonate or a combination of surface reacted calcium carbonate and mineral material, a method for controlling the blocking of polymer(s) containing compositions, a polymer(s) containing composition comprising surface reacted calcium carbonate or a combination of surface reacted calcium carbonate and mineral material, a coating composition comprising such polymer(s) containing composition, as well as a substrate coated with such coating composition.

Blocking is a common problem related to many polymeric films and coatings. It is an undesirable attraction between adjacent layers of films or coated sheets, often making it difficult to separate individual layers. Certain polymers including polyolefins and polyesters even have an inherent tendency to block.

Blocking can occur during extrusion, conversion processes, upon winding onto a take-up roll or stacking of finished converted films or film coated material and during storage.

Especially, blocking may occur shortly after coating of a substrate with a polymer, when the coating is not yet completely dried before winding or stacking it, and the presence of moisture significantly increases tackiness of the polymer coating.

There are numerous reasons for blocking from intrinsic properties of the respective polymers, surface smoothness of the film, pressures or temperatures during processing, use, or storage. The degree or severity of the blocking is a function of the film's characteristics as well as the effects of outside forces acting on the film.

In some cases, also the glass transition temperature ($T_g$) may play a role with respect to blocking. In the paper industry, polymers with low $T_g$ values are often used for coating applications. Unfortunately, these polymers sometimes cause problems in the paper production due to tackiness and resulting strong blocking. This may be the case if the web temperature is higher than the $T_g$ value of the polymer e.g. during the winding process. This problem, in some cases, may be controlled, if the paper web is cooled down via cooling cylinders to temperatures lower than the $T_g$ value of the polymer. This, however, is often not possible either due to missing equipment or if the $T_g$ values of the used polymers are around or lower than room temperature.

The introduction of an anti-blocking agent into a polymer is thus another well-known approach to reduce blocking and will reduce the blocking tendency allowing films or sheets to be easily separated. The anti-blocking agent usually creates a microscopic roughening of the film or sheet surface which reduces the available contact area between adjacent layers.

Many different materials can be used to give an anti-blocking effect. Commercially important anti-blocking additives may be inorganic such as diatomaceous earth, synthetic silica, talc, ceramic spheres, mica, clay such as kaolin, calcium carbonate, or organic such as bis-amides, secondary amides, primary amides, organic or metallic stearates, etc.

For example, U.S. Pat. No. 6,284,034 B1 describes a pigment material for use in a coating composition suitable for coating a sheet material to be printed comprising a component A, a fine pigment material suitable for gloss coating of a sheet material, and component B, a coarse pigment material, wherein the weight ratio of component A to component B is at least 4:1. The pigment material when employed in a coating composition helps to provide anti-blocking, wherein the minor amount of coarse pigment particles present in the coating composition beneficially causes the coated surface to have localised points of protrusion in the surface profile. Component A and B may each independently be selected from any one or more of the materials known for use in paper coating compositions.

U.S. Pat. No. 6,018,010 A relates to a very specific polymer namely a polymer comprising structural units derived from an α,β-unsaturated carboxylic acid monomer and structural units derived from another vinyl monomer, said polymer having (1) an acid value of 50 mg KOH/g or higher, (2) when analyzed with a differential scanning calorimeter, a differential DSC curve having at least one peak top in each of the range of from −80 to 20° C., and the range of from 20 to 120° C., and (3) a parallel-ray transmittance of 80% or higher. It is mentioned that, when the polymer to be obtained is especially required to have tensile strength and anti-block properties, these properties can be imparted by increasing the height of the higher-temperature-side peak top in the differential curve. Furthermore, a polyvalent-metal salt may be added to obtain a metal-crosslinked polymer.

U.S. Pat. No. 4,012,543 A relates to a coated paper having high gloss and high bulk and a method for producing the paper wherein a high-solids coating is applied to the paper and pressed against a heated finishing surface. In this respect it is mentioned that gloss-calendering to produce glossy finishes on paper is problematic due to the competing and relatively incompatible requirements that the paper coating should be wet enough to be moulded by the gloss-calendering roll and at the same time dry enough that the coating does not stick to the gloss-calendering drum. Therefore, anti-sticking agents are employed, such as sulphonated castor oil and potassium oleate. The preferred anti-sticking agent comprises a mixture of predispersed calcium stearate and emulsified oleic acid.

U.S. Pat. No. 5,266,397 A relates to a silica filler comprising special amorphous silica particles. In this respect it is discussed that amorphous silica have heretofore been widely used inorganic fine particles as anti-blocking agent for resin films, wherein fine powdery silica having silanol groups on the surfaces thereof have been substituted by oleophilic groups, zeolite particles have been added to biaxially undrawn polypropylene film, or fine powdery silica having a specific apparent specific density and surface area had been used. However, none of these fillers was suitable for the use in heat-sensitive recording paper, which is solved by the silica filler described therein having a certain primary particle diameter, a certain apparent specific gravity, a specific silica elementary particle diameter and a specific agglomeration degree.

From this it is obvious that the choice of anti-blocking additives not only depends on the polymer being used, but also on the quality requirements of the end product, wherein the properties of the polymer film or coating should not be negatively affected by the anti-blocking agent.

Such properties are numerous, and may be optical properties, mechanical properties or very specific properties, such as barrier properties of polymer coatings preventing, e.g., the migration of mineral oil residues from recycled board into packaged food such as described in WO 2013/083504A1.

Thus, there is a continuous need for new anti-blocking agents being broadly applicable without negatively influencing the polymer properties.

It has now been found that the use of calcium carbonate, which has been specifically surface treated, may improve the blocking behaviour of polymer films and coatings, and are especially useful in combination with polymer films and coatings having barrier properties.

Accordingly, the present invention relates to the use of a surface-reacted calcium carbonate as an anti-blocking agent in polymer(s) containing compositions, wherein the surface-reacted calcium carbonate is a reaction product of natural ground or precipitated calcium carbonate with carbon dioxide and one or more $H_3O^+$ ion donors in an aqueous medium, wherein the carbon dioxide is formed in situ by the $H_3O^+$ ion donor treatment and/or is supplied from an external source.

A $H_3O^+$ ion donor in the context of the present invention is a Brønsted acid and/or an acid salt.

The calcium carbonate subjected to surface treatment may be natural ground calcium carbonate (GCC) or synthetic, i.e. precipitated calcium carbonate (PCC).

The natural ground calcium carbonate preferably is selected from calcium carbonate containing minerals selected from the group comprising marble, chalk, dolomite, limestone and mixtures thereof. Precipitated calcium carbonate is preferably selected from the group comprising precipitated calcium carbonates having aragonitic, vateritic or calcitic mineralogical crystal forms or mixtures thereof.

In a preferred embodiment, the natural or precipitated calcium carbonate is ground prior to the treatment with one or more $H_3O^+$ ion donors and carbon dioxide. The grinding step can be carried out with any conventional grinding device such as a grinding mill known to the skilled person.

In a preferred process for the preparation the natural and synthetic calcium carbonate, either finely divided, such as by grinding, or not, is suspended in water. Preferably, the slurry has a content of natural or synthetic calcium carbonate within the range of 1 wt % to 80 wt %, more preferably 3 wt % to 60 wt %, and even more preferably 5 wt % to 40 wt %, based on the weight of the slurry.

In a next step, an acid, is added to the aqueous suspension containing the natural or synthetic calcium carbonate. Preferably, the acid has a $pK_a$ at 25° C. of 2.5 or less. If the $pK_a$ at 25° C. is 0 or less, the acid is preferably selected from sulphuric acid, hydrochloric acid, or mixtures thereof. If the $pK_a$ at 25° C. is from 0 to 2.5, the acid is preferably selected from $H_2SO_3$, $M^+HSO_4^-$ ($M^+$ is an alkali metal ion selected from the group comprising sodium and potassium, lithium or other Group I metals), $H_3PO_4$, oxalic acid or mixtures thereof.

The one or more acids can be added to the suspension as a concentrated solution or a more diluted solution. Preferably, the molar ratio of the acid to the natural or synthetic calcium carbonate is from 0.05 to 4, more preferably from 0.1 to 2.

As an alternative, it is also possible to add the acid to the water before the natural or synthetic calcium carbonate is suspended.

In a next step, the natural or synthetic calcium carbonate is treated with carbon dioxide. If a strong acid such as sulphuric acid or hydrochloric acid is used for the acid treatment of the natural or synthetic calcium carbonate, the carbon dioxide is automatically formed in a sufficient amount to achieve the required molar concentration. Alternatively or additionally, the carbon dioxide can be supplied from an external source.

Acid treatment and treatment with carbon dioxide can be carried out simultaneously which is the case when a strong acid is used. It is also possible to carry out acid treatment first, e.g. with a medium strong acid having a $pK_a$ in the range of 0 to 2.5, followed by treatment with carbon dioxide supplied from an external source.

Preferably, the concentration of gaseous carbon dioxide in the suspension is, in terms of volume, such that the ratio (volume of suspension):(volume of gaseous $CO_2$) is from 1:0.05 to 1:20, even more preferably 1:0.05 to 1:5.

In a preferred embodiment, the acid treatment step and/or the carbon dioxide treatment step are repeated at least once, more preferably several times. Subsequent to the acid treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural or synthetic calcium carbonate as an aqueous suspension having a pH of greater than 6.0, preferably greater than 6.5, more preferably greater than 7.0, even more preferably greater than 7.5. If the aqueous suspension is allowed to reach equilibrium, the pH is greater than 7. A pH of greater than 6.0 can be adjusted without the addition of a base when stirring of the aqueous suspension is continued for a sufficient time period, preferably 1 hour to 10 hours, more preferably 1 to 5 hours.

Alternatively, prior to reaching equilibrium, which occurs at a pH greater than 7, the pH of the aqueous suspension may be increased to a value greater than 6 by adding a base subsequent to carbon dioxide treatment. Any conventional base such as sodium hydroxide or potassium hydroxide can be used.

Further details about the preparation of the surface-reacted natural calcium carbonate are disclosed in WO 00/39222 A1, WO 2004/083316 A1, WO 2005/121257 A2, WO 2009/074492 A1, EP 2 264 108 A1, EP 2 264 109 A1 and US 2004/0020410 A1, the content of these references herewith being included in the present application.

Surface-reacted calcium carbonate being useful in the present invention may also be prepared by contacting ground natural calcium carbonate with at least one water-soluble acid and with gaseous $CO_2$, wherein said acid(s) have a $pK_a$ of greater than 2.5 and less than or equal to 7, when measured at 20° C., associated with the ionisation of their first available hydrogen, and a corresponding anion formed on loss of this first available hydrogen capable of forming water-soluble calcium salts. Subsequently, at least one water-soluble salt, which in the case of a hydrogen-containing salt has a $pK_a$ of greater than 7, when measured at 20° C., associated with the ionisation of the first available hydrogen, and the salt anion of which is capable of forming water-insoluble calcium salts, is additionally provided.

In this respect, exemplary acids are acetic acid, formic acid, propanoic acid and mixtures thereof, exemplary cations of said water-soluble salt are selected from the group consisting of potassium, sodium, lithium and mixtures thereof, and exemplary anions of said water-soluble salt are selected from the group consisting of phosphate, dihydrogen phosphate, monohydrogen phosphate, oxalate, silicate, mixtures thereof and hydrates thereof.

Further details about the preparation of these surface-reacted natural calcium carbonates are disclosed in EP 2 264 108 A1 and EP 2 264 109 A1, the content of which herewith being included in the present application.

Similarly, surface-reacted precipitated calcium carbonate is obtained. As can be taken in detail from WO 2009/074492 A1, surface-reacted precipitated calcium carbonate is obtained by contacting precipitated calcium carbonate with $H_3O^+$ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H_3O^+$ ions, where said $H_3O^+$ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said $H_3O^+$ ions may be provided by the addition of an acid or an acid salt of said anion, or the addition of an acid or an acid salt which simultaneously serves to provide all or part of said excess solubilized calcium ions.

In a preferred embodiment of the preparation of the surface-reacted natural or synthetic calcium carbonate, the natural or synthetic calcium carbonate is reacted with the acid and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural or synthetic calcium carbonate before adding the acid and/or carbon dioxide.

Alternatively, the silicate and/or silica and/or aluminium hydroxide and/or earth alkali aluminate and/or magnesium oxide component(s) can be added to the aqueous suspension of natural or synthetic calcium carbonate while the reaction of natural or synthetic calcium carbonate with an acid and carbon dioxide has already started. Further details about the preparation of the surface-reacted natural or synthetic calcium carbonate in the presence of at least one silicate and/or silica and/or aluminium hydroxide and/or earth alkali aluminate component(s) are disclosed in WO 2004/083316 A1, the content of this reference herewith being included in the present application.

The surface-reacted natural or synthetic calcium carbonate can be kept in suspension, optionally further stabilised by a dispersant. Conventional dispersants known to the skilled person can be used. A preferred dispersant is polyacrylic acid.

Alternatively, the aqueous suspension described above can be dried.

The surface reacted calcium carbonate may have different crystal shapes, such as e.g. the shape of roses, golfballs and/or brains. It is preferred that the surface reacted calcium carbonate has a rose-like crystal shape.

In a preferred embodiment, the surface-reacted calcium carbonate has a specific surface area of from 20 m$^2$/g to 200 m$^2$/g, preferably from 27 m$^2$/g to 180 m$^2$/g, more preferably from 30 m$^2$/g to 160 m$^2$/g, even more preferably from 45 m$^2$/g to 150 m$^2$/g, especially preferably from 48 m$^2$/g to 140 m$^2$/g, and most preferably from 75 m$^2$/g to 100 m$^2$/g measured using nitrogen and the BET method. The BET specific surface area in the meaning of the present invention is defined as the surface area of the particles divided by the mass of the particles. As used therein the specific surface area is measured by adsorption using the BET isotherm (ISO 9277:1995) and is specified in m$^2$/g.

It is furthermore preferred that the surface-reacted calcium carbonate particles have a volume median grain diameter $d_{50}$(vol) of from 1 to 50 µm, preferably from 1.3 to 25 µm, more preferably 2 to 20 µm, even more preferably from 2.4 to 10 µm, and most preferably from 5.1 to 8 µm.

It may furthermore be preferred that the surface-reacted calcium carbonate particles have a grain diameter $d_{98}$(vol) of from 1 to 75 µm, preferably from 2 to 50 µm, more preferably 3 to 30 µm, even more preferably from 4 to 20 µm, and most preferably from 5 to 10 µm.

The value $d_x$ represents the diameter relative to which x % of the particles have diameters less than $d_x$. This means that the $d_{98}$ value is the particle size at which 98% of all particles are smaller. The $d_{98}$ value is also designated as "top cut". The $d_x$ values may be given in volume or weight percent. The $d_{50}$ (wt) value is thus the weight median particle size, i.e. 50 wt % of all grains are smaller than this particle size, and the $d_{50}$ (vol) value is the volume median particle size, i.e. 50 vol. % of all grains are smaller than this particle size.

Preferably, the surface-reacted calcium carbonate has an intra-particle intruded specific pore volume within the range of 0.1 to 1.3 cm$^3$/g, more preferably of 0.18 to 1.25 cm$^3$/g, especially preferably of 0.49 to 1.22 cm$^3$/g and most preferably of 0.7 to 1 cm$^3$/g calculated from a mercury intrusion porosimetry measurement using a Micromeritics Autopore IV 9500 mercury porosimeter having a maximum applied pressure of mercury 414 MPa (60 000 psi), equivalent to a Laplace throat diameter of 0.004 µm (~nm). The equilibration time used at each pressure step is 20 seconds. The sample material is sealed in a 5 cm$^3$ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p1753-1764).

The total pore volume seen in the cumulative intrusion data can be separated into two regions with the intrusion data from 214 µm down to about 1-4 µm showing the coarse packing of the sample between any agglomerate structures contributing strongly. Below these diameters lies the fine interparticle packing of the particles themselves. If they also have intraparticle pores, then this region appears bi modal. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Thus, the intra-particle porosity determined as the pore volume per unit volume of sample is within the range of from 20 vol. % (v/v) to 99 vol. % (v/v), preferably from 30 vol. % (v/v) to 70 vol. % (v/v), more preferably from 40 vol. % (v/v) to 60 vol. % (v/v), e.g. 50 vol. % (v/v), calculated from a mercury porosimetry measurement.

The intra-particle pore size of the surface-reacted calcium carbonate preferably is in a range of from 10 to 100 nm, more preferably in a range of between 20 and 80 nm, especially from 30 to 70 nm, e.g. 50 nm determined by mercury porosimetry measurement.

In a preferred embodiment the surface reacted calcium carbonate according to the present invention is used in polymer(s) containing compositions, wherein the polymer(s) preferably have a glass transition temperature $T_g$ in the range from 1 to 50° C., more preferably from 10 to 40° C., especially preferably 15 to 30° C., most preferably 20 to 25° C.

The "glass transition temperature $(T_g)$" is a well-known parameter to those skilled in the art, and is the temperature range, where a thermosetting polymer changes from a more pliable, compliant or "rubbery" state to a hard, rigid or "glassy" state upon cooling. The $T_g$ is usually measured using Differential Scanning Calorimetry (DSC): ASTM E1356, "Standard Test Method for Assignment of the Glass Transition Temperature by Differential Scanning Calorimetry". The $T_g$ is actually a temperature range, rather than a specific temperature. The convention, however, is to report a single temperature defined as the midpoint of the temperature range, bounded by the tangents to the two flat regions of the heat flow curve.

Especially preferred polymer(s) are selected from the group comprising homo- and/or copolymers of monomers selected from the group comprising alkyl (meth)acrylates, preferably methyl (meth)acrylate, ethyl (meth)acrylate and n-butyl (meth)acrylate; acid monomers, preferably acrylic acid and methacrylic acid, esters thereof; ethylenically unsaturated nitriles, preferably acrylonitrile; ethylene; propylene; butadiene; styrene; and derivatives, salts and mixtures thereof.

According to the present invention, the polymers may be used in the form of powders, aqueous solutions, suspensions or emulsions, and may optionally contain further additives.

Particularly, polymer(s) are preferred such as those described in WO 2013/083504 A1, namely aqueous polymer dispersions comprising at least one copolymer obtainable by emulsion polymerization of (a) one or more principal monomers selected from the group consisting of $C_1$-$C_4$ alkyl (meth)acrylates,
(b) 0.1 to 5 wt % of one or more acid monomers,
(c) 0 to 20 wt % of acrylonitrile and
(d) 0 to 10 wt % of further monomers other than the monomers (a) to (c), wherein the glass transition temperature of the copolymer is in the range from 10 to 45° C., wherein the emulsion polymerization is carried out in an aqueous medium in the presence of at least one carbohydrate compound.

Further commercially available polymers which may be advantageously used in the present invention may be those of the Cartaseal® series available from Clariant, e.g. Cartaseal® TXU liq. (acrylic polymer), Cartaseal® SVU liq. (ethylene-acrylic acid copolymer), Cartaseal VWF-DP (styrene-acrylic copolymer), Cartaseal SW-DP (ethylene-acrylic acid copolymer); Acronal® LR 9014 available from BASF SE (dispersion of acrylic acid ester and methacrylic acid ester polymers), Ultraseal W-952 available from Kcim additec surface GmbH, 55481 Kirchberg, Germany (mixture of a washing compound and a styrene-butadiene copolymer), Ultraseal W-953 available from Kcim additec surface GmbH, 55481 Kirchberg, Germany (mixture of a paraffin wax and a styrene-butadiene copolymer), Tecseal E787/50 available from Trüb Emulsions Chemie (ethylene-acrylic-copolymer dispersion), the EPOTAL® series available from BASF SE, e.g. EPOTAL® SP-101D.

The polymer(s) containing composition according to the present invention is defined to contain at least one polymer as defined above. It may however also comprise mixtures of the above defined and other polymers, as well as conventional additives such as additives selected from the group comprising thickeners, plasticizers, stabilizers, lubricants, biocides, dispersants, milling aids, rheology modifiers, defoamers, optical brighteners, dyes, pH controlling agents and mixtures thereof.

It has turned out that it may be especially advantageous to use the surface reacted calcium carbonate in combination with a mineral material selected from the group comprising mineral pigments and/or fillers, preferably from the group comprising precipitated calcium carbonate (PCC); natural ground calcium carbonate (GCC); dolomite; talc; bentonite; clay; magnesite; satin white; sepiolite, huntite, diatomite; silicates; titanium dioxide; and mixtures thereof.

The mineral material has a weight median particle size $d_{50}$ (wt) of from 0.01 to 15 μm preferably from 0.1 to 10 μm, more preferably from 0.3 to 5 μm, especially from 0.5 to 4 μm, and most preferably from 0.7 to 2 μm.

Natural ground calcium carbonate may be selected from the group consisting of marble, limestone, chalk and mixtures thereof, and precipitated calcium carbonate may be selected from precipitated calcium carbonates having aragonitic, vateritic or calcitic mineralogical crystal forms or mixtures thereof, and may more preferably be R-PCC (rhombohedral PCC), S-PCC (scalenohedral PCC) and A-PCC (aragonitic PCC).

In this respect, it is preferred that the surface reacted calcium carbonate and the mineral material are combined in a weight ratio of from 1:15 to 15:1, preferably from 1:10 to 10:1, more preferably 1:7.5 to 7.5:1, most preferably 1:4 to 4:1, especially 1:1.5 to 1.5:1, and particularly 1:1.

Any one of the components may, independently from each other, be provided in dry form, or in the form of suspensions, dispersions, slurries or solutions, and be mixed in any order.

Thus, the surface reacted calcium carbonate or the combination of surface reacted calcium carbonate and mineral material may be added to the polymer(s) containing compositions in any order. Thus it may be advantageous to first mix the surface reacted calcium carbonate and the mineral material, and subsequently add this mixture to the polymer(s) containing composition. It is, however, also possible to add the surface reacted calcium carbonate first, and subsequently the mineral material, or vice versa.

The mixing of the components may be carried out by any suitable mixing means known to those skilled in the art.

In a special embodiment the aqueous coating composition may contain further solvents such as alcohol ethers, alcohols, aliphatic hydrocarbons, esters, and mixtures thereof. Preferred alcohols are methanol ethanol, n-propanol, i-propanol, n-butanol, s-butanol, and t-butanol.

It is preferred that the surface reacted calcium carbonate or the combination of surface reacted calcium carbonate and mineral material is present in the polymer(s) comprising composition in an amount of from 5 to 100 wt %, preferably 10 to 50 wt %, more preferably 15 to 45 wt %, especially preferably 20 to 40 wt %, most preferably 25 to 33 wt % based on the dry weight of the polymer(s).

The surface reacted calcium carbonate or the combination of surface reacted calcium carbonate and mineral material is preferably present in the polymer(s) comprising composition in a weight based ratio of surface reacted calcium carbonate or the combination of surface reacted calcium carbonate and mineral material to polymer(s) of 1:9 to 4:1, more preferably 1:4 to 4:1, especially preferably from 1:3 to 3:1, even more preferably from 1.5:1 to 1:1.5 and particularly 1:1.

According to the present invention, the polymer(s) containing composition comprising surface reacted calcium carbonate or a combination of surface reacted calcium carbonate and mineral material may be coated onto a substrate, the substrate being preferably selected from the group comprising virgin or recycled papers and boards, such as calendered and uncalendered, coated and uncoated papers and boards; synthetic papers; non-woven products; packaging material; constructional materials such as decorative papers and paperboard; and surface finishings.

The board can be selected from cardboard; paperboard, including containerboard, folding boxboard, solid bleached board, solid unbleached board, white lined chipboard, and binder's board; and corrugated fibreboard. For distinguishing the various types of boards a commonly valid code was defined, this code consisting of features of the surface treatment, of the feed and an index. Examples for the designation of boards are GN1, GD, UN4.

In the surface treatment of the board one distinguishes between cast-coated (A), pigment-coated (G) and uncoated (U). The feed form forming the board can be grouped in five different groups: chemically bleached fresh fibres (Z), chemically unbleached fresh fibres (N), mechanical wood pulp (C), recycled pulp with white, yellow or brown rear side (T), and recycled pulp with grey rear side (D).

The index can be derived from the below table:

| Index | Colour of rear side (with the exception of GD and UD) | specific volume of GD and UD [cm³/g] |
|---|---|---|
| 1 | white | >1.45 |
| 2 | pale (yellow) | 1.3-1.45 |
| 3 | — | <1.3 |
| 4 | brown | — |

Preferred boards are selected from the group consisting of GC1, GC2, GC3, UC2, GT1, GT2, GT3, GT4, GD2, and GD3.

The substrate may be coated, once or several times, with the polymer(s) containing composition according to the present invention, wherein the coating may be carried out by conventional techniques well-known in the art and suitable for the respective substrates, e.g. by blade or roll coating, film press coating, rod coating, curtain coating or any other technologies known to those skilled in the art.

The coat weight of each coating layer may be from 1 to 30 g/m², preferably from 2 to 25 g/m², more preferably from 3 to 20 g/m², especially preferably from 4 to 15 g/m², and most preferably from 5 to 10 g/m², e.g. 7 g/m².

Accordingly, the resulting coated substrate is a further aspect of the present invention.

The coated substrate, and especially a coated paper or board, also shows a good mineral oil and grease barrier.

The stickiness and thus the blocking of the polymer(s) containing compositions coated onto a substrate may be significantly reduced or even be completely prevented by the use of surface reacted calcium carbonate.

Accordingly, further aspects of the present invention are a method for controlling the blocking of polymer(s) containing compositions by the use of a surface-reacted calcium carbonate as defined above, as well as an anti-blocking agent comprising surface-reacted calcium carbonate or a combination of surface reacted calcium carbonate and mineral material as defined above.

Furthermore the present invention relates to a polymer(s) containing composition comprising surface reacted calcium carbonate or a combination of surface reacted calcium carbonate and mineral material as defined above.

A further aspect of the present invention is a coating composition comprising a polymer(s) containing composition comprising surface reacted calcium carbonate as defined above, as well as a coating composition comprising a polymer(s) containing composition comprising a combination of surface reacted calcium carbonate and mineral material as defined above.

Especially in the latter case, it is preferred that the mineral material is selected from natural ground calcium carbonate (GCC), and especially preferred that the surface reacted calcium carbonate and the mineral material, preferably natural ground calcium carbonate (GCC), are combined in a weight ratio of from 1:1 to 1:4.

In this case, it is furthermore especially preferred that the polymer(s) contained in the polymer(s) containing composition are selected from aqueous polymer dispersions as described in WO 2013/083504 A1, i.e. comprise at least one copolymer obtainable by emulsion polymerization of (a) one or more principal monomers selected from the group consisting of $C_1$-$C_4$ alkyl (meth)acrylates,
(b) 0.1 to 5 wt % of one or more acid monomers,
(c) 0 to 20 wt % of acrylonitrile and
(d) 0 to 10 wt % of further monomers other than the monomers (a) to (c), wherein the glass transition temperature of the copolymer is in the range from 10 to 45° C., wherein the emulsion polymerization is carried out in an aqueous medium in the presence of at least one carbohydrate compound.

It is particularly advantageous that the combination of surface reacted calcium carbonate and mineral material is present in the polymer(s) comprising composition in a weight based ratio of the combination of surface reacted calcium carbonate and mineral material to polymer(s) of 1:4.

The following figures, examples and tests will illustrate the present invention, but are not intended to limit the invention in any way.

EXAMPLES

I. Measurement Methods

Figure 1:
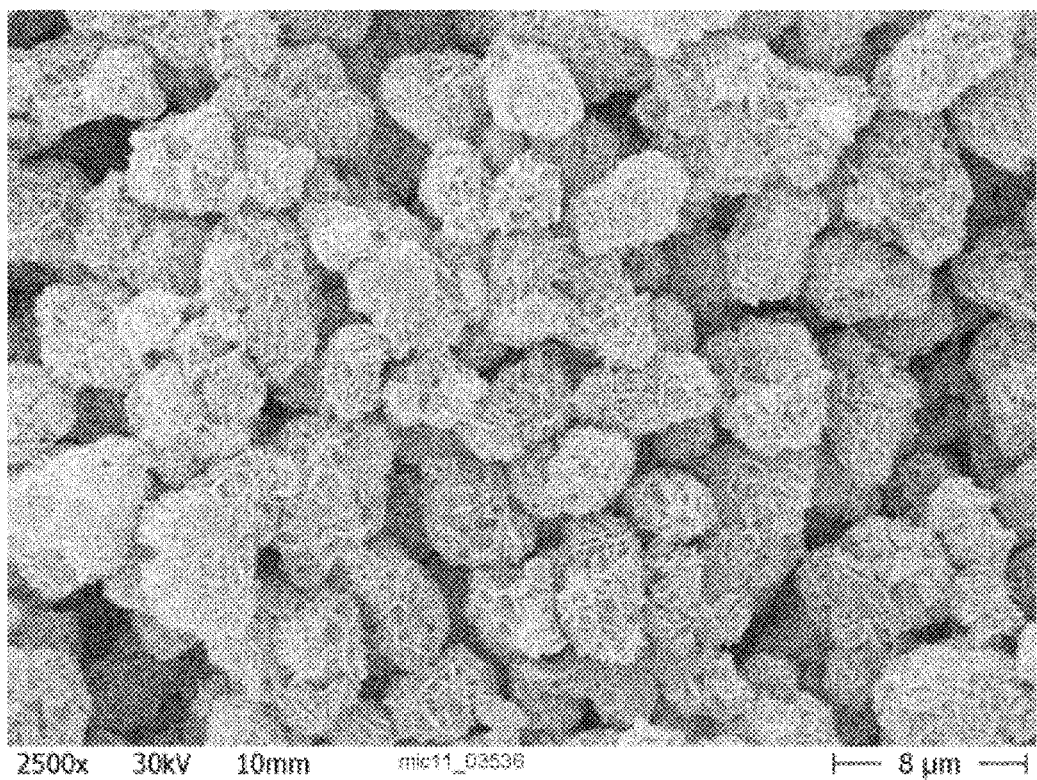
FIG. 1 shows an SEM image of surface reacted calcium carbonate

In the following, measurement methods implemented in the examples are described.

Particle size distribution (mass % particles with a diameter<X), $d_{50}$ (wt) value (weight median grain diameter) and $d_{98}$ (wt) value of a particulate material:

The $d_{50}$ (wt) and $d_{98}$ (wt) values were measured using a Sedigraph 5120 from the company Micromeritics, USA. The method and the instrument are known to the skilled person and are commonly used to determine grain size of fillers and pigments. The measurements were carried out in an aqueous solution comprising 0.1 wt % $Na_4P_2O_7$. The samples were dispersed using a high speed stirrer and supersonics.

Particle size distribution (volume % particles with a diameter<X), $d_{50}$(vol) value (volume median grain diameter) and $d_{98}$(vol) value of a particulate material:

Volume median grain diameter $d_{50}$(vol) was evaluated using a Malvern Mastersizer 2000 Laser Diffraction System. The $d_{50}$(vol) or $d_{98}$(vol) value, measured using a Malvern Mastersizer 2000 Laser Diffraction System, indicates a diameter value such that 50% or 98% by volume, respectively, of the particles have a diameter of less than this value. The raw data obtained by the measurement is analysed using the Mie theory, with a particle refractive index of 1.57 and an absorption index of 0.005.

Solids Content of an Aqueous Suspension

The suspension solids content (also known as "dry weight") was determined using a Moisture Analyser MJ33 from the company Mettler-Toledo, Switzerland, with the following settings: drying temperature of 160° C., automatic switch off if the mass does not change more than 1 mg over a period of 30 s, standard drying of 5 to 20 g of suspension.

Specific Surface Area (SSA)

The specific surface area was measured via the BET method according to ISO 9277 using nitrogen, following conditioning of the sample by heating at 250° C. for a period of 30 minutes. Prior to such measurements, the sample is filtered within a Büchner funnel, rinsed with deionised water and dried overnight at 90 to 100° C. in an oven. Subsequently the dry cake is ground thoroughly in a mortar and the resulting powder placed in a moisture balance at 130° C. until a constant weight is reached.

SEM Images

Scanning electron micrographs (SEM) were carried out by adjusting the solids content to a concentration of 20 wt % in water using an ultraturax (rotor-stator-mixer). A few drops (approximately 100 mg) were diluted in 250 ml distilled water and filtered through 0.2 μm pore membrane filter. Preparations obtained on the membrane filter in this way were sputtered with gold and evaluated in the SEM at various enlargements.

Tack Force

The tack force of the coatings to be evaluated was determined by measurements with an Ink Surface Interaction (ISIT) Tester (SeGan Ltd., UK).

Principle of the Test

Surface tack is measured by a special attachment (SeGan Ltd., UK) which consists of a solenoid, a coil spring, a load cell and a contact disc (P. A. C. Gane, E. Scyler, and A. Swan. Some novel aspects of ink/paper Interaction in offset printing. International Printing and Graphic Arts Conference, Halifax, Nova Scotia. Atlanta: Tappi Press. 209-228, 1994). The contact disc is pressed against the surface of the sample platen by electromagnetic force acting on the solenoid. This action applies an extensional force on the coil spring mounted in parallel with the solenoid. Contact time and force can be varied by electronic controls to optimize adhesion between contact disc and the surface.

At cessation of the electromagnetic force the contact disc is retracted from the surface by the strain force of the extended coil spring, strong enough to achieve separation of the disc from the surface. The strain gauge, fixed between contact disc and coil spring, generates a load-dependent signal which is recorded as the measured tack force. The sequence is automatically repeated for a predefined number of cycles chosen to span the regions of the tack force under study. The build-up of the tensile force required to achieve each individual separation is recorded with time and can be analysed through specifically designed software. The maximum level of tensile force at each test point is plotted as measured tack force development with time.

II. Material

1. Substrate

Synteape®: white half-matt PP foil; 62 g/m² (available from YUPO (Art.: 675227))

2. Surface-Reacted Calcium Carbonate (SRCC)

SRCC 1

Surface reacted calcium carbonate SRCC 1 was prepared as follows:

10 litres of an aqueous suspension of ground calcium carbonate were provided in a mixing vessel by adjusting the solids content of a ground marble calcium carbonate from Hustadmarmor having a weight based median particle size of 90% less than 2 μm, as determined by sedimentation, such that a solids content of 16 wt %, based on the total weight of the aqueous suspension, is obtained.

Whilst mixing the slurry, 1.8 kg phosphoric acid was added in form of an aqueous solution containing 30 wt % phosphoric acid to said suspension over a period of 9 minutes at a temperature of 70° C. Finally, after the addition of the phosphoric acid, the slurry was stirred for additional 5 minutes, before removing it from the vessel and drying.

The obtained SRCC 1 had a rose-like structure (cf. FIG. 1) and the following properties: $d_{50}$(vol)=5.1 μm, $d_{98}$(vol)=9.9 μm, and SSA=48 $m^2g^{-1}$. The intra-particle intruded specific pore volume is 1.224 $cm^3/g$ (for the pore diameter range of 0.004 to 0.51 μm).

SRCC 2

SRCC2 is a surface reacted calcium carbonate that is commercially available in dry form from Omya AG, Switzerland.

SRCC 2 has a rose type structure and the following properties: $d_{50}(vol)=2.4$ μm; $d_{98}(vol)=9$ μm; BET SSA=27 m²/g; The intra-particle intruded specific pore volume is 0.491 cm³/g (for the pore diameter range of 0.004 to 0.421 μm).

SRCC 3

SRCC 3 is a surface reacted calcium carbonate that is commercially available from Omya AG, Switzerland.

SRCC 3 has a rose type structure and the following properties: $d_{50}(vol)=1.3$ μm; $d_{98}(vol)=5$ μm; BET SSA=45 m²/g; The intra-particle intruded specific pore volume is 0.18 cm³/g (for the pore diameter range of 0.004 to 0.09 μm).

3. Further Mineral Material (MM)

MM 1: natural ground calcium carbonate; $d_{50}$ (wt)=1.5 μm; $d_{98}$ (wt)=10 μm; solids content 78 wt.-% (available from Omya AG, Switzerland)

MM 2: very fine natural ground calcium carbonate powder, especially surface treated with a fatty acid; $d_{50}$ (wt)=1.7 μm; $d_{98}$ (wt)=5 μm; (available from Omya AG, Switzerland)

3. Polymers

The polymer used in the following experiments was prepared according to Example 4 of WO 2013/083504 A1.

A reactor was purged with nitrogen and 427.1 g of demineralized water and maltodextrin (C Dry MD 01915 (94.7% strength); Cargill) was added in an amount of 30 pphm (weight parts per hundred weight parts of monomers). The mixture in the initial charge was heated to 86° C. Then, 3.2 g of sodium peroxodisulphate (7%/strength) were added before stirring for 5 minutes. The emulsion feed consisting of 180.0 g of water, 20.0 g of emulsifier (Dowfax® 2A1, 45% strength) and 450.0 g of a monomer mixture of 55 wt % ethyl acrylate, 44 wt % methyl methacrylate, and 1 wt % acrylic acid was metered into the reactor over 2 hours. Concurrently with the emulsion feed the initiator feed was started (12.9 g of sodium peroxodisulphate, 7% strength) and likewise metered in over 2 hours. After the emulsion feed has ended, the system was allowed to polymerize for 45 min. The reactor was then cooled down to room temperature.

The resulting dispersion had a solids content of 47 wt % and the obtained polymer had a $T_g$ of 30° C.

III. Experiments

1. Sample Preparation

The tackiness or stickiness of polymer coatings were tested by comparing the force development of samples measured using the Ink Surface Interaction Tester (ISIT) described above.

The samples having the compositions given in the tables below were prepared as follows, unless indicated otherwise:

In a 2 litres beaker, the polymer dispersion was provided at a pH of 8.5, which was adjusted using a 30% NaOH solution. Subsequently the mixture of surface reacted calcium carbonate and mineral material was added under vigorous stirring at 500 rpm for 10 min with a Pendraulik laboratory dissolver of the LD 50 type, from Pendraulik GmbH, Springe, Germany.

The resulting mixtures were rod coated onto the substrate using an Erichsen Bar Coater (K-Control-Coater K202, Model 624/Fabr. No. 57097-4) with wire-wound rod No. 3 and air dried on a belt dryer at 7.0 mmin⁻¹ at 150° C. The coating weight was about 7 g/m², unless indicated otherwise.

Subsequently, the surface of the samples was wetted by performing two passes of a gravure roller depositing 1 g/m² of water with each pass at 300 N with a 5 s delay between each pass. The tack is measured at 500 N, comparable to the standard ISIT test method.

Finally, tack force measurements were carried out as described above. The following results are the average of 3 measurements per sample, unless otherwise indicated.

2. Results

First, the tackiness of uncoated Synteape® paper was compared with samples containing different amounts of MM 1 and SRCC 1 as given in table 1 below:

TABLE 1

| Sample | Polymer [wt %] | MM 1 [wt %] | SRCC 1 [wt %] |
|---|---|---|---|
| 1 | — | — | — |
| 2 | 75 | — | — |
| 3 | 75 | 25 | — |
| 4 | 75 | 23 | 2 |
| 5 | 75 | 20 | 5 |
| 6 | 75 | 15 | 10 |
| 7 | 75 | 10 | 15 |
| 8 | 75 | 5 | 20 |

Figure 2:
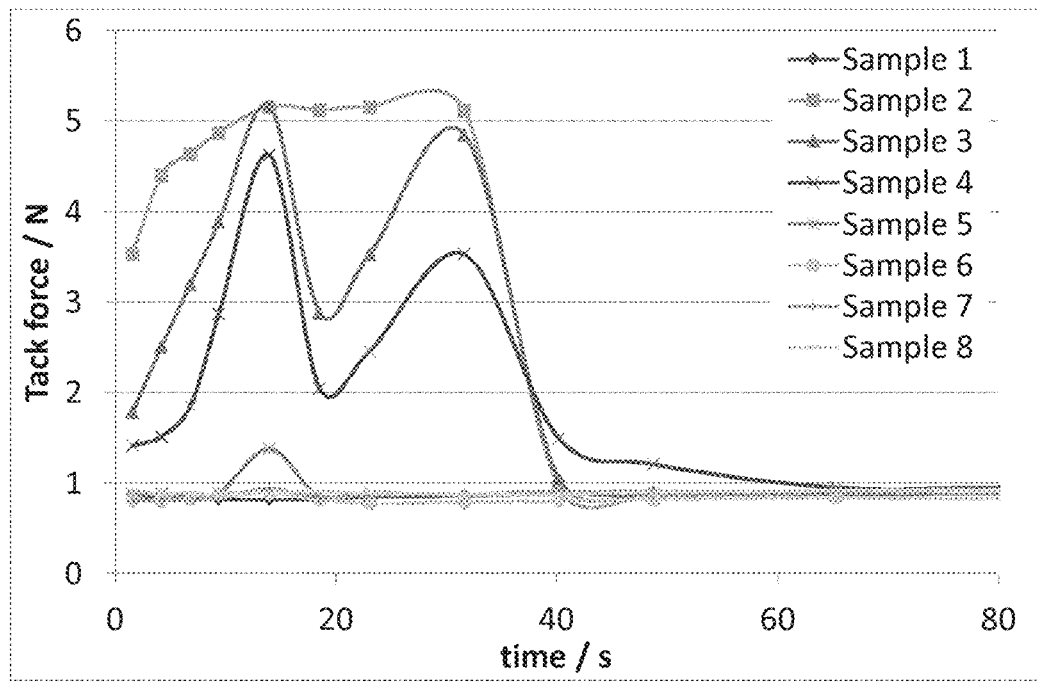
FIG. 2 shows the results of tack force measurements obtained for uncoated Synteape® paper and Synteape® paper coated with different coating compositions comprising polymer alone and in combination with MM 1 and SRCC 1.

As can be taken from FIG. 2, sample 1 representing the uncoated substrate has the lowest tack force, whereas the highest tack force is developed by sample 2 representing the polymer-alone coated substrate.

By adding 25 wt % of MM 1 to the polymer (sample 3) the tackiness shows a bi-modal tack curve. This bi-modality is assumed to be the water initially being seen as surface moisture, then being absorbed and then resulting in the stickiness of the sheet by solubilising the polymer matrix.

Replacing 2 wt/o of MM 1 by SRCC 1 (sample 4) reduces the stickiness slightly, whereas replacing 5 wt % by SRCC 1 (sample 5) almost entirely prevents stickiness.

No stickiness can finally be observed for samples 6-8, wherein 10, 15 and 20 wt % of the mineral material was replaced by SRCC 1.

In view of the above results, further experiments were carried out with coatings containing SRCC 1 only, and with an alternative mineral material and compared to the uncoated Synteape® paper of sample 1. The compositions can be taken from table

TABLE 2

| Sample | Polymer [wt %] | MM 2 [wt %] | SRCC 1 [wt %] |
|---|---|---|---|
| 9 | 95 | — | 5 |
| 10 | 90 | — | 10 |
| 11 | 75 | 25 | — |

Figure 3:
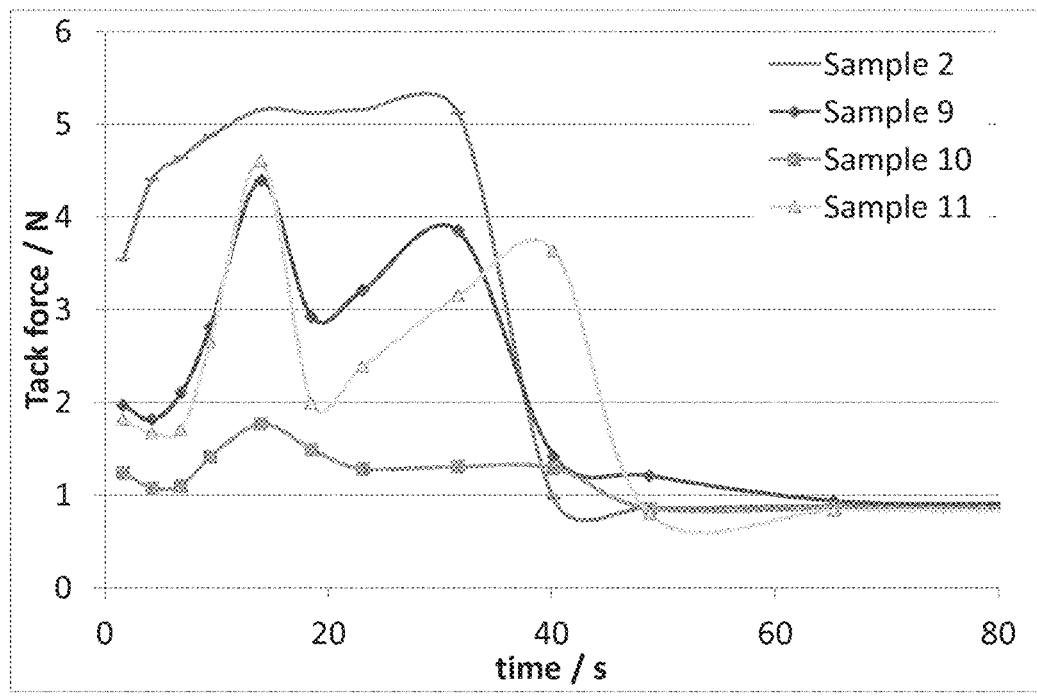
FIG. 3 shows the results of tack force measurements obtained for Synteape® paper coated with different coating compositions comprising polymer alone and in combination with MM 2 and SRCC 1.

As can be taken from FIG. 3, the use of 5 wt % of SRCC 1 (sample 9) reduces stickiness, but only slightly, whereas the use of 10 wt % (sample 10) has a considerably stronger impact on stickiness comparable to sample 5 above containing 20 wt % MM 1 and 5 wt % of SRCC 1, but at a lower mineral material amount.

Looking at sample 11, it can be seen that MM 2, which is a hydrophobic pigment that does not easily mix with the polymer, does not considerably reduce the stickiness of the coating even at an amount of 25 wt %.

Further tests were made surface-reacted calcium carbonate SRCC 2 having the compositions given in table 3, and being coated onto Synteape®.

TABLE 3

| Sample | Polymer [wt %] | MM 1 [wt %] | SRCC 2 [wt %] |
|---|---|---|---|
| 12 | 75 | 20 | 5 |
| 13 | 75 | 15 | 10 |

Figure 4:
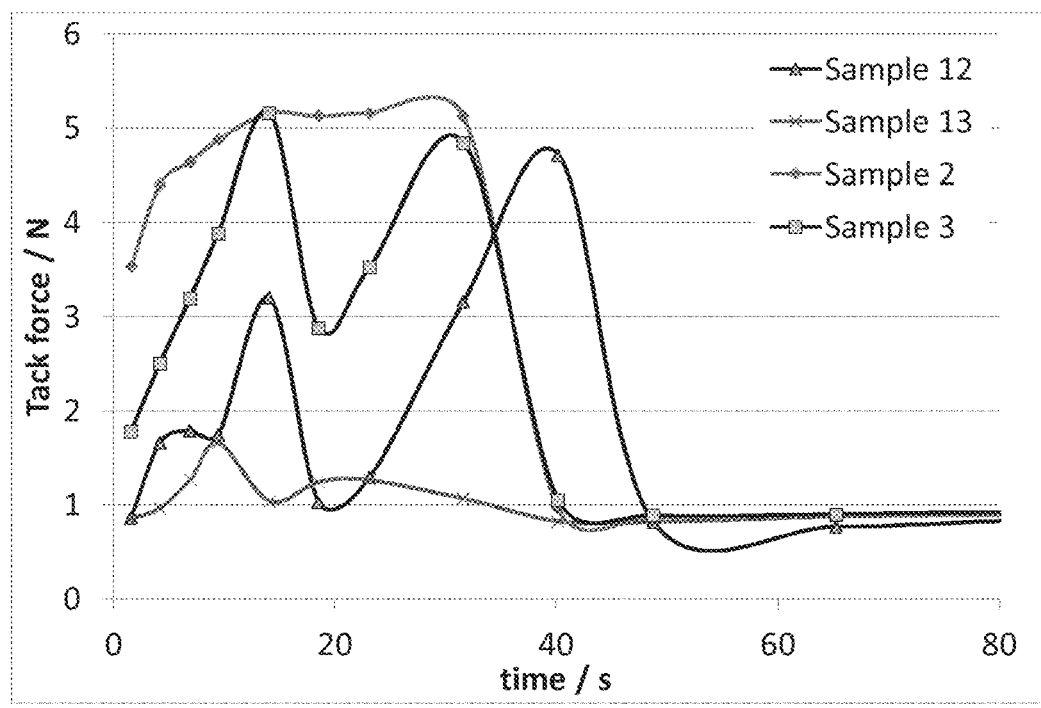
FIG. 4 shows the results of tack force measurements obtained for Synteape® paper coated with different coating compositions comprising polymer alone and in combination with MM 1 and SRCC 2.

As can be taken from FIG. 4 showing the results of coatings containing SRCC 2 (samples 12 and 13) applied to Synteape® paper compared to paper coated with polymer only (sample 2) and paper coated with MM 1 only (sample 3), samples 12 and 13 showed an increasing reduction of tackiness with increasing amount of SRCC 2.

Furthermore, the influence of the coat weight of the polymer(s) comprising composition was evaluated using MM1 and a SRCC 3 in the amounts given in table 4.

TABLE 4

| Sample | Coat weight [g/m$^2$] | Polymer [wt %] | MM 1 [wt %] | SRCC 3 [wt %] |
|---|---|---|---|---|
| 14 | 5 | 80 | 16 | 4 |
| 15 | 7 | 80 | 16 | 4 |
| 16 | 10 | 80 | 16 | 4 |
| 17 | 15 | 80 | 16 | 4 |
| 18 | 5 | 80 | 12 | 8 |
| 19 | 7 | 80 | 12 | 8 |
| 20 | 10 | 80 | 12 | 8 |
| 21 | 15 | 80 | 12 | 8 |

Figure 5:
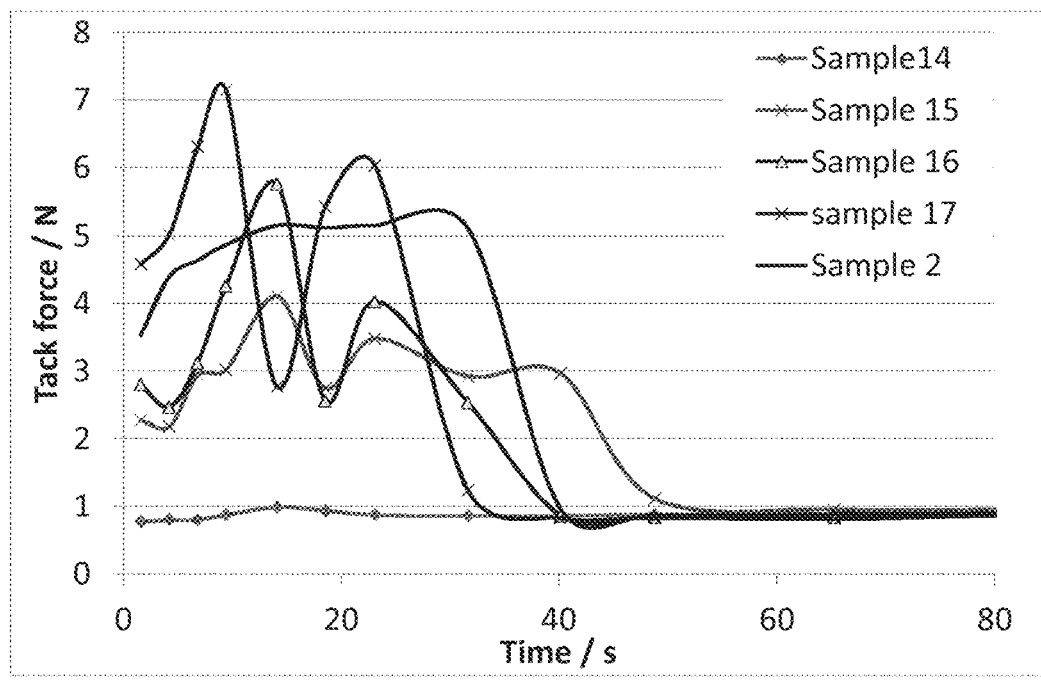
FIG. 5 shows the results of tack force measurements obtained for Synteape® paper coated with coating compositions comprising polymer alone and in combination with MM 1 and SRCC 4 at different coating weights.
Figure 6:
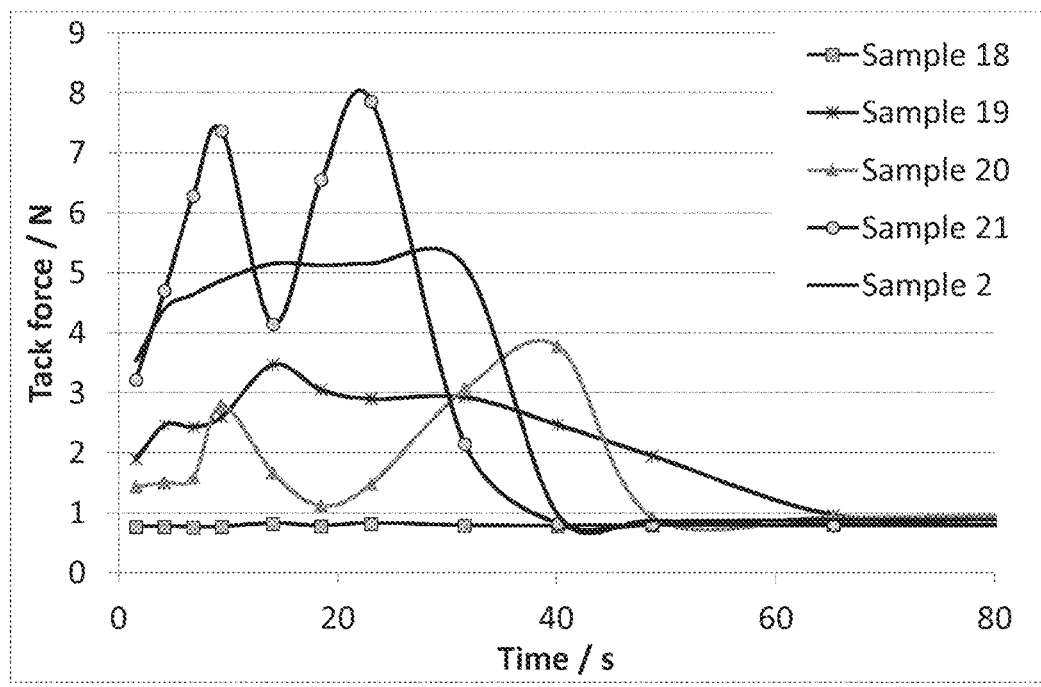
FIG. 6 shows the results of tack force measurements obtained for Synteape® paper coated with coating compositions comprising polymer alone and in combination with MM 1 and SRCC 4 at different coating weights

As can be taken from FIGS. 5 and 6, the samples that show the best performance (most reduced tack response) as regards the coat weight applied to Synteape® paper are those with the lowest coat weights (samples 14 and 18). Samples 15 and 19 having a coat weight of 7 gm$^{-2}$ require higher tack forces, which, however, are still below those of the paper coated with polymer only. Coat weights of 10 gm$^{-2}$ (samples 16 and 20) provide about the same results, wherein sample 20 having a higher amount of SRCC 3 provides a lower tack response over the earlier time scale. At a coat weight of 15 gm$^{-2}$, the tack response for both samples, sample 17 and 21 is higher at the peaks when compared to the tack response of the polymer alone, and thus not desirable.

Thus, it can be seen that the coat weight should not be too high, wherein compositions containing a higher SRCC content provide better results as regards stickiness and the overall amount of mineral material.

The invention claimed is:

1. A coating composition comprising a polymer containing composition comprising surface-reacted calcium carbonate, wherein the surface-reacted calcium carbonate is a reaction product of natural ground or precipitated calcium carbonate with carbon dioxide and one or more $H_3O^+$ ion donors in an aqueous medium, wherein the carbon dioxide is formed in situ by the $H_3O^+$ ion donor treatment and/or is supplied from an external source, wherein the composition further comprises a mineral material and the mineral material comprises one or more of precipitated calcium carbonate (PCC), natural ground calcium carbonate (GCC), dolomite, talc, bentonite, clay, magnesite, satin white, sepolite, huntite, diatomite, a silicate, and titanium dioxide, and the surface-reacted calcium carbonate has an intra-particle intruded specific pore volume of 0.1 to 1.3 cm$^3$/g, calculated from a mercury intrusion porosimetry measurement.

2. The coating composition according to claim 1, wherein the mineral material is selected form natural ground calcium carbonate (GCC).

3. The coating composition according to claim 2, wherein the surface reacted calcium carbonate and the mineral material are present in a weight ratio of from 1:15 to 15:1.

4. The coating composition according to claim 2, wherein the surface reacted calcium carbonate and the mineral material are present in a weight ratio of from 1:4 to 4:1.

5. The coating composition according to claim 2, wherein the surface reacted calcium carbonate and the mineral material are present in a weight ratio of from 1:1 to 1:4.

6. The coating composition according to claim 2, wherein the combination of surface reacted calcium carbonate and mineral material is present in the polymer containing composition in a weight based ratio of the combination of surface reacted calcium carbonate and mineral material to polymer of 1:4.

7. The coating composition according to claim 2, wherein the surface-reacted calcium carbonate is in an amount of at least 5 wt %, based on the dry weight of the polymer.

8. The coating composition according to claim 2, wherein the polymer is selected from aqueous polymer dispersions comprising at least one copolymer obtained by emulsion polymerization of:
    (a) one or more principal monomers selected from the group consisting of $C_1$-$C_4$ alkyl (meth)acrylates,
    (b) 0.1 to 5 wt % of one or more acid monomers,
    (c) 0 to 20 wt % of acrylonitrile, and
    (d) 0 to 10 wt % of further monomers other than the monomers (a) to (c);
wherein the glass transition temperature of the copolymer is in the range from 10 to 45° C., and wherein the emulsion polymerization is carried out in an aqueous medium in the presence of at least one carbohydrate compound.

9. The coating composition according to claim 2, wherein the surface-reacted calcium carbonate is a reaction product of natural ground calcium carbonate comprising marble, chalk, dolomite, limestone, and any mixture thereof, with carbon dioxide and one or more $H_3O^+$ ion donors in an aqueous medium, wherein the carbon dioxide is formed in situ by the $H_3O^+$ ion donor treatment and/or is supplied from an external source.

10. The coating composition according to claim 2, wherein the surface-reacted calcium carbonate is a reaction product of precipitated calcium carbonate comprising one or more aragonitic, vateritic, and calcitic mineralogical crystal forms, with carbon dioxide and one or more $H_3O^+$ ion donors in an aqueous medium, wherein the carbon dioxide is formed in situ by the $H_3O^+$ ion donor treatment and/or is supplied from an external source.

11. The coating composition according to claim 2, wherein the surface-reacted calcium carbonate also has a specific surface area of form 20 m$^2$/g to 200 m$^2$/g, measured using nitrogen and the BET method according to ISO 9277.

12. The coating composition according to claim 2, wherein the surface-reacted calcium carbonate also has a volume median grain diameter $d_{50}$(vol) of from 1 to 50 μm.

13. The coating composition according to claim 2, wherein the surface-reacted calcium carbonate also has a volume median grain diameter $d_{50}$(vol) of from 1 to 8 μm.

14. The coating composition according to claim 2, wherein the polymer has a glass transition temperature $T_g$ in the range from 1 to 50° C.

15. The coating composition according to claim 2, wherein the polymer comprises one or more of homo- and/or copolymers of monomers selected from the group consisting of alkyl (meth)acrylates, methyl (meth)acrylate, ethyl (meth)acrylate, n-butyl (meth)acrylate, acid monomers, acrylic acid, methacrylic acid, esters of acylic acid, esters of methacrylic acid, ethylenically unsaturated nitriles, acrylonitrile, ethylene, propylene, butadiene, styrene, and salts thereof.

16. The coating composition according to claim 2, wherein the surface-reacted calcium carbonate is present in the polymer containing composition in an amount of 5 to 50 wt %, based on the dry weight of the polymer.

17. The coating composition according to claim 2, wherein the surface reacted calcium carbonate or a combination of the surface reacted calcium carbonate and the additional mineral material is present in the polymer containing composition in an amount of from 5 to 40 wt %, based on the dry weight of the polymer.

18. The coating composition according to claim 2, wherein the surface reacted calcium carbonate or a combination of the surface reacted calcium carbonate and the additional mineral material is present in the polymer containing composition in a weight based ratio of surface reacted calcium carbonate or a combination of surface reacted calcium carbonate and additional mineral material to polymer of 1:9 to 4:1.

19. The coating composition according to claim 2, wherein the polymer containing composition is coated on a substrate.

20. The coating composition according to claim 2, wherein the polymer containing composition is coated onto the substrate at a coat weight from 1 to 30 $g/m^2$.

21. The coating composition according to claim 2, wherein the polymer containing composition is coated onto the substrate at a coat weight from 2 to 10 $g/m^2$.

* * * * *